(12) United States Patent
Cripe

(10) Patent No.: US 7,493,832 B2
(45) Date of Patent: Feb. 24, 2009

(54) FABRICATION OF A MAGNETOELASTIC TORQUE SENSOR

(75) Inventor: David W. Cripe, Williamsburg, VA (US)

(73) Assignee: Continiental Automotive Systems US, Inc., Auburn Hills ( * ) Notice: Subject to any disclaimer, the term of this patent is extended or adjusted under 35 U.S.C. 154(b) by 0 days.

(21) Appl. No.: 11/781,414

(22) Filed: Jul. 23, 2007

(65) Prior Publication Data
US 2008/0011104 A1    Jan. 17, 2008

(51) Int. Cl.
*G01L 3/00* (2006.01)
(52) U.S. Cl. .................................. 73/862.333
(58) Field of Classification Search ............ 73/862.336, 73/862.333, 862.234, 862.335; 148/101, 148/104
See application file for complete search history.

(56) References Cited

U.S. PATENT DOCUMENTS

| | | | |
|---|---|---|---|
| 4,150,566 A | 4/1979 | Loebel et al. | |
| 4,896,544 A | 1/1990 | Garshelis | |
| 4,908,932 A | 3/1990 | Yagi et al. | |
| 4,976,160 A | 12/1990 | Dobler et al. | |
| 5,052,232 A | 10/1991 | Garshelis | |
| 5,193,267 A | 3/1993 | Satoh et al. | |
| 5,280,729 A | 1/1994 | Aoki et al. | |
| 5,351,555 A | 10/1994 | Garshelis | |
| 5,465,627 A | 11/1995 | Garshelis | |
| 5,589,645 A | 12/1996 | Kobayashi et al. | |
| 5,591,925 A | 1/1997 | Garshelis | |
| 5,696,575 A | 12/1997 | Kohnen et al. | |
| 5,706,572 A | 1/1998 | Garshelis | |
| 5,708,216 A | 1/1998 | Garshelis | |
| 5,741,982 A | 4/1998 | Kobayashi et al. | |
| 5,887,335 A | 3/1999 | Garshells | |
| 5,889,215 A | 3/1999 | Kilmartin et al. | |
| 5,907,105 A | 5/1999 | Pinkerton et al. | |
| 5,939,881 A | 8/1999 | Slater et al. | |
| 6,047,605 A | 4/2000 | Garshelis | |
| 6,145,387 A | 11/2000 | Garshelis | |
| 6,222,363 B1 | 4/2001 | Cripe | |
| 6,298,467 B1 | 10/2001 | Chuang et al. | |
| 6,300,855 B1 | 10/2001 | Clark et al. | |
| 6,346,812 B1 | 2/2002 | May et al. | |
| 6,490,934 B2 | 12/2002 | Garshelis | |
| 6,516,508 B1 | 2/2003 | Gandarillas | |
| 6,553,847 B2 | 4/2003 | Garshelis | |
| 6,698,299 B2 | 3/2004 | Cripe | |
| 2002/0078765 A1 | 6/2002 | Shinoura | |
| 2002/0112549 A1 | 8/2002 | Cheshmehdoost et al. | |
| 2002/0162403 A1 | 11/2002 | Cripe | |

FOREIGN PATENT DOCUMENTS

| | | |
|---|---|---|
| DE | 3407917 | 9/1985 |
| DE | 3706719 | 9/1987 |
| DE | 3750041 | 11/1994 |

OTHER PUBLICATIONS

U.S. Appl. No. 11/233,696.*
German Examination Report dated Jun. 19, 2007.

* cited by examiner

*Primary Examiner*—Jewel Thompson

(57) ABSTRACT

A method of fabricating a magnetoelastic torque sensor includes plating a magnetoelastic material to a magnetically inert substrate, and its endowment with uniaxial magnetic anisotropy through the creation within the transducer element of stress anisotropy. The plating of magnetostrictive material to the magnetically inert substrate provides a less expensive torque element that exhibits desired levels of accuracy and reliability.

15 Claims, 3 Drawing Sheets

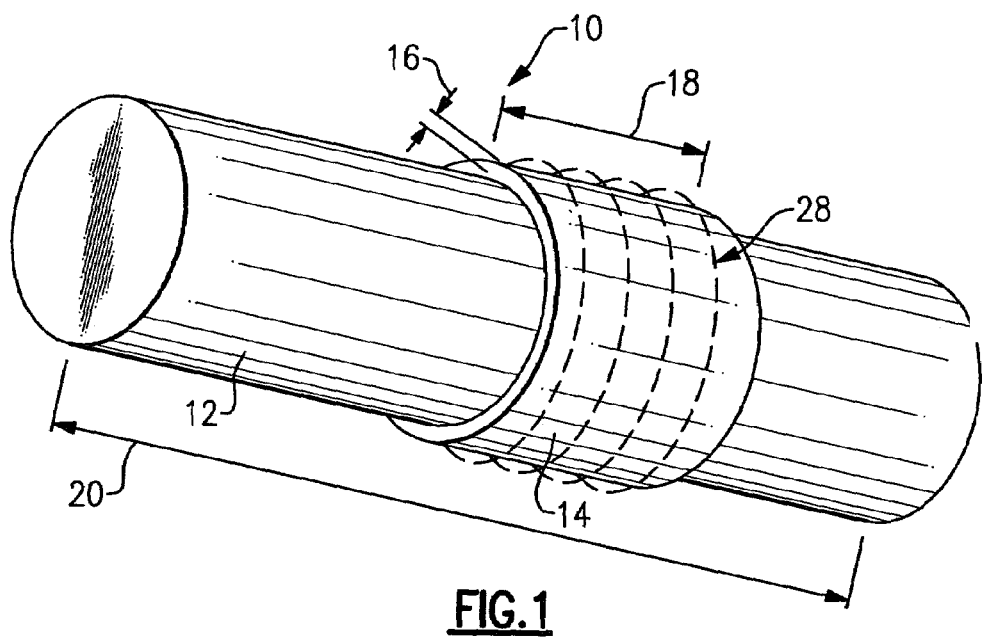
FIG.1
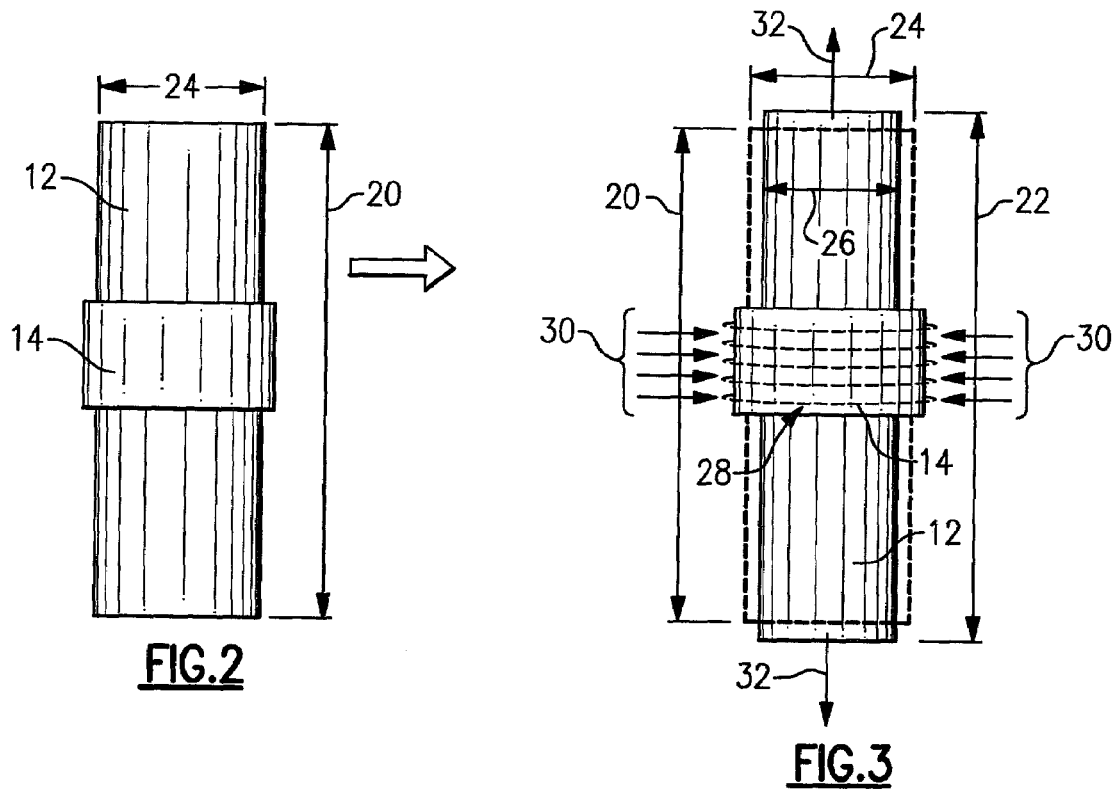
FIG.2
FIG.3

FABRICATION OF A MAGNETOELASTIC TORQUE SENSOR

BACKGROUND OF THE INVENTION

This invention relates to a method of fabricating a magnetoelastic torque sensor. More particularly, this invention relates to fabrication of a magnetoelastic torque sensor having a transducer ring affixed to a substrate in a plating process.

Conventional non-contact torque sensors include a magnetoelastic ring that is supported on a shaft. A uniaxial, circumferential stress anisotropy is created in the magnetoelastic ring such that a circumferential magnetic anisotropy results, creating a predisposition within the transducer element toward a circumferential magnetic field within the magnetoelastic ring. The circumferential magnetic field becomes distorted responsive to surface shear stress resulting from an applied torque to the shaft. The amount and direction of magnetic field distortion is measured and provides a value utilized to provide the desired torque measurements.

Conventional methods of fabricating a torque sensor include the pressing of a ring of positively-magnetostrictive material onto a magnetically inert shaft. The shaft includes a taper such that a press fit of the ring onto the shaft will produce the desired circumferential tension or "hoop stress". The circumferential tension creates a magnetic easy axis and thereby facilitates the stability of the circumferential magnetic field. The press fit between the ring and the shaft is a limiting factor to the capability and accuracy of such torque sensors. Any slipping or relative movement between the shaft and the ring distorts the actual reading of torque and causes a shift in the zero point of any torque measurement.

A known improvement over press fitting of rings onto a shaft includes the use techniques such as thermal-spraying or kinetic metallization to apply a magnetoelastic material, particularly nickel, onto a non-ferromagnetic stainless steel substrate. The desired stress anisotropy for the magnetoelastic material is provided by applying an axial load and heat to the substrate during the application of the magnetoelastic material. Once applied, the substrate is cooled and the axial load released. This results in an axial tensile stress and a compressive circumferential hoop stress on the magnetoelastic materials, thereby producing the desired magnetic field. However, such a fabrication method is difficult to control, requires the use of an expensive grade of stainless steel for the substrate, and wastes much of the magnetoelastic material during the thermal spraying process.

Accordingly, it is desirable to develop a method of fabricating a magnetoelastic torque element that utilizes less expensive materials in a more reliable manner.

SUMMARY OF THE INVENTION

An example magnetoelastic torque sensor fabricated according to this invention includes a ring of magnetoelastic material that is plated to a non-ferromagnetic base shaft. The shaft, fabricated of non-magnetic materials such as stainless steel, brass, or titanium, provides a substrate that is magnetically inert for the magnetic transducer material. The substrate shaft is left in a non-stressed condition during plating of the shaft. The plating process produces a very high ring to shaft adhesion strength. The high ring shaft adhesion strength improves operation of the torque sensor and reduces hysteresis and other occurrences that are common causes of sensor failure and degradation.

If the magnetoelastic material chosen for the transducer is a positively-magnetostrictive material, such as most steel alloys, the desired stress anisotropy is one in which the transducer material possesses an axial compressive stress, and a circumferential tensile stress. Conversely, a negatively-magnetostrictive material, such as Nickel or Cobalt and their alloys require an axial tensile stress and a circumferential compressive stress. Upon completion of the plating process, the substrate shaft is axially stressed in the appropriate direction to a yield point that causes a permanent change in axial dimension of the shaft. The permanent axial deformation also causes a change in shaft diameter, which in turn causes a circumferential stress on the plated transducer ring creating requisite stress anisotropy within the material.

Unlike the use of thermal application processes an electro plating process is a chemical plating process that yields a surface with high uniformity, low porosity, and high strength. The plating process creates virtually no waste of ring material. Further, the ring to shaft adhesion strength is much higher than in any other known torque fabrication technique.

Accordingly, the method according to this invention produces a magnetoelastic element for a torque sensor that has improved adhesion between the substrate and the magnetoelastic material ring at lower cost and greater durability.

These and other features of the present invention can be best understood from the following specification and drawings, the following of which is a brief description.

BRIEF DESCRIPTION OF THE DRAWINGS

FIG. 1 is a perspective view of an example torque element according to this invention.

FIG. 2 is a schematic view of a plating step of an example torque element according to this invention.

FIG. 3 is a schematic view of a fabrication step for an example torque element according to this invention.

DETAILED DESCRIPTION OF THE PREFERRED EMBODIMENT

Figure 4:
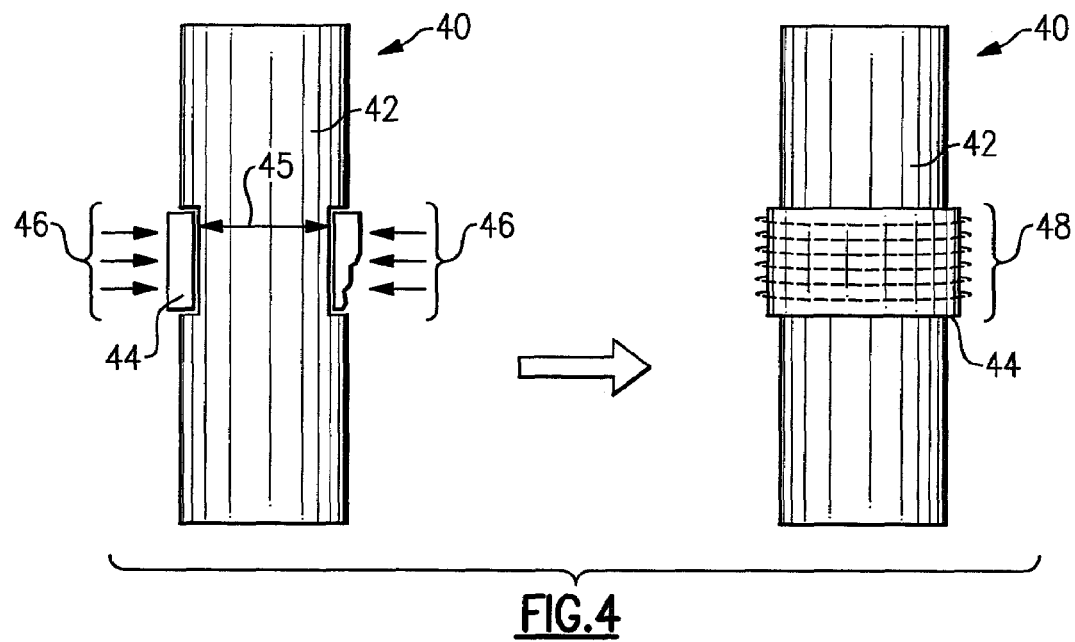
FIG. 4 is a schematic view of another fabrication step according to this invention.

Referring to FIG. 1, a torque element 10 comprises a shaft 12 and a magnetoelastic nickel ring 14. The magnetoelastic ring 14 is plated to the shaft 12 such that torque exerted on the shaft 12 causes torsional stresses on the magnetoelastic ring 14. The magnetoelastic ring 14 includes a stress anisotropy such that a tensile stress exists in the axial direction, and a compressive stress is circumferentially disposed about the shaft 12.

The circumferential stress or hoop stress encourages formation of a magnetic field having circumferential lines of magnetic flux. As appreciated, the circumferential lines of magnetic flux distort responsive to a torque applied to the shaft 12. The distortion is measured to determine torque. The magnetoelastic ring 14 comprises a nickel material plated on the shaft 12. The shaft 12 is fabricated from a non-magnetic grade stainless steel.

Referring to FIGS. 2 and 3, the inventive method includes first plating the magnetoelastic ring 14 onto the shaft 12. During the plating step, no load is placed on the shaft 12 and therefore the stress within the magnetoelastic ring 14 is isotropic and not disposed in the desired circumferential orientation. In order to operate as desired, the magnetoelastic ring 14 should be of higher yield strength than the underlying substrate. The example magnetoelastic ring 14 comprises a nickel-plating material that typically includes yield strength on the order of 60,000 to 80,000 psi. The relationship between the yield strength of the plating material and the shaft material determines the selection of the shaft material. Accordingly, using nickel-plating material provides for a shaft 12 having a lower yield strength, which in turn provides for the use of a more economical grade of stainless steel alloy. The example shaft is fabricated form a 316-grade stainless steal alloy that in an annealed condition includes yield strength of approximately 35,000 psi. As should be understood, other grades and combinations of materials with desirable characteristics may also be utilized.

As understood, circumferential stress within the magnetoelastic ring 14 provides anistropic magnetic properties within the ring 14. The magnetic properties generated by the hoop stress are such that less resistance to a magnetic field is provided in the circumferential direction. The as plated nickel material is of a uniform thickness and porosity and does not include the desired circumferential stress. Circumferential stress must therefore be introduced to the ring 14 to induce the stress anisotropy.

Once plated, an axial tension load, schematically indicated at 32, is exerted on the shaft 12 until plastic deformation occurs. The shaft 12 after plating is of a length 20 and then is plastically deformed to a length 22. The extended length 22 is accompanied by a reduction in diameter from an original diameter 24 to a reduced diameter 26. The reduction in diameter 26 of the shaft 12 induces a compressive stress, schematically indicated at 30, on the magnetoelastic ring 14 that creates the desired magnetic anisotropy circumferentially about the shaft 12.

The desired anisotropy circumferentially disposed within the ring 14 about the shaft 12 creates the desired magnetic easy-axis 28 in the circumferential direction, facilitating a circumferential magnetization. Application of torque to the shaft 12 distorts this magnetic field 28 in a helical direction away from the circumferential direction and towards a more axial direction. Measurement of this shift in the magnetic field provides for the accurate determination of torque exerted on the shaft 12. As appreciated, plastic deformation in the axial direction is accompanied by deformation and reduction in diameter 26. This reduction in diameter produces the desired compressive stresses on the plated nickel material.

Referring to FIG. 4, another method according to this invention includes the initial step of plating magnetoelastic material 44 to a shaft 42. The shaft 42 serves as a substrate for the magnetoelastic material that forms the ring 44. In this example method, the ring 44 is illustrated as being plated within a step or reduced diameter region 45 of the shaft 42. Although, in some instances a reduced diameter region 45 providing a reduced cross-section may be preferable it is not required, the ring 44 may be plated on the greatest diameter of the shaft 42. The shaft 42 may have a single common continuous uniform diameter and the ring 44 may be plated onto that diameter in a desired location.

Further, the ring 44 may be of any axial width as is required for the application specific requirement. Typically, the width of the ring 44 will correspond with a pick up device utilized to sense changes in the magnetic field within the magnetoelastic material of the ring 44.

It is understood in the field of electroplating that the electrolytic process of plating material to a substrate results in a natural state where the plated material produces a significant stress in itself. This significant stress is in many instances overcome by specific application and process parameters that are tailored to reduce this induced stress. However, an example method and application of plating for a magnetoelastic torque element, such tensile stress is favorable as a component of the desired stress anisotropy. Accordingly, it is possible with the proper selection of substrate and magnetoelastic material to instill the required tensile hoop stresses in the ring material 44 simply through the plating processes.

Preferably, in the processes illustrated in FIG. 4 the underlying shaft 42 is magnetically inert stainless steel material such as the stainless steel alloy 316. The magnetoelastic material plated on this material is a nickel iron alloy that instills the desired tensile stresses by the controlled conditions of the plating process. In some instances the induced tensile stress can be significant up to 100,000 psi.

Accordingly, the process illustrated in FIG. 4 comprises the steps of selecting a substrate material compatible with a ring plating material. The ring plating material comprises a nickel iron mix. The nickel iron mix is formulated in such a combination that the plating process itself will create a desired level of tensile stress in the ring 44. Once the plating has completed to form the ring 44 the required tensile stresses on the ring 44 create the desired magnetic field orientation circumferentially within the ring 44 around the shaft 42. Such a process is desirable if the material selections are within the application specific parameters that require no additional processing once the ring material 44 has been plated onto the shaft 42.

Figure 5:
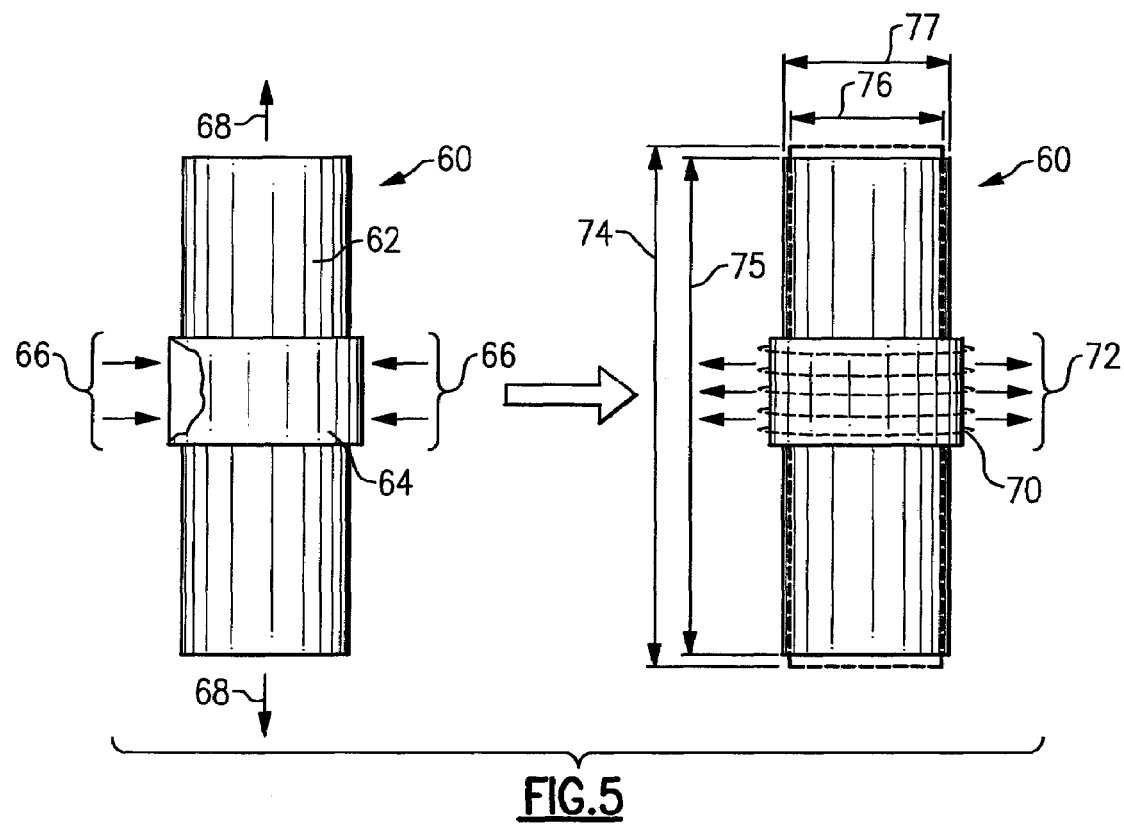
FIG. 5 is a schematic view of another example method of fabricating a torque element according to this invention.

Referring to FIG. 5, another example method according to this invention is illustrated and includes the initial step of plating ring material 64 onto a shaft 62. The ring material 64 is plated by applying nickel iron or nickel material as indicated at 66 onto the shaft 62. During the plating process, the shaft 62 is placed under an axial load as is indicated by arrows 68. The axial load 68 is applying a tensile stress on the shaft 62 that does not create a plastic deformation.

Once the plating process is complete, the axial load 68 is released and the shaft 62 will substantially regain a substantially original length and width. The stretched length 74 will be reduced to a substantially natural length 75. As appreciated, when an axial tension load is placed on the shaft 62, the diameter 76 is reduced over that of a non-stressed diameter 77. Release of the axial load 68 causes the diameter to move from the stretched state 76 to the relaxed state 77. The relaxed state 77 is greater than the stretched state such that tensile stresses 72 are placed on the ring 64 in a desired manner. These tensile stresses create the desired circumferential magnetic easy access desired to provide the desired direction of the magnetic field created in the nickel iron ring.

Figure 6:
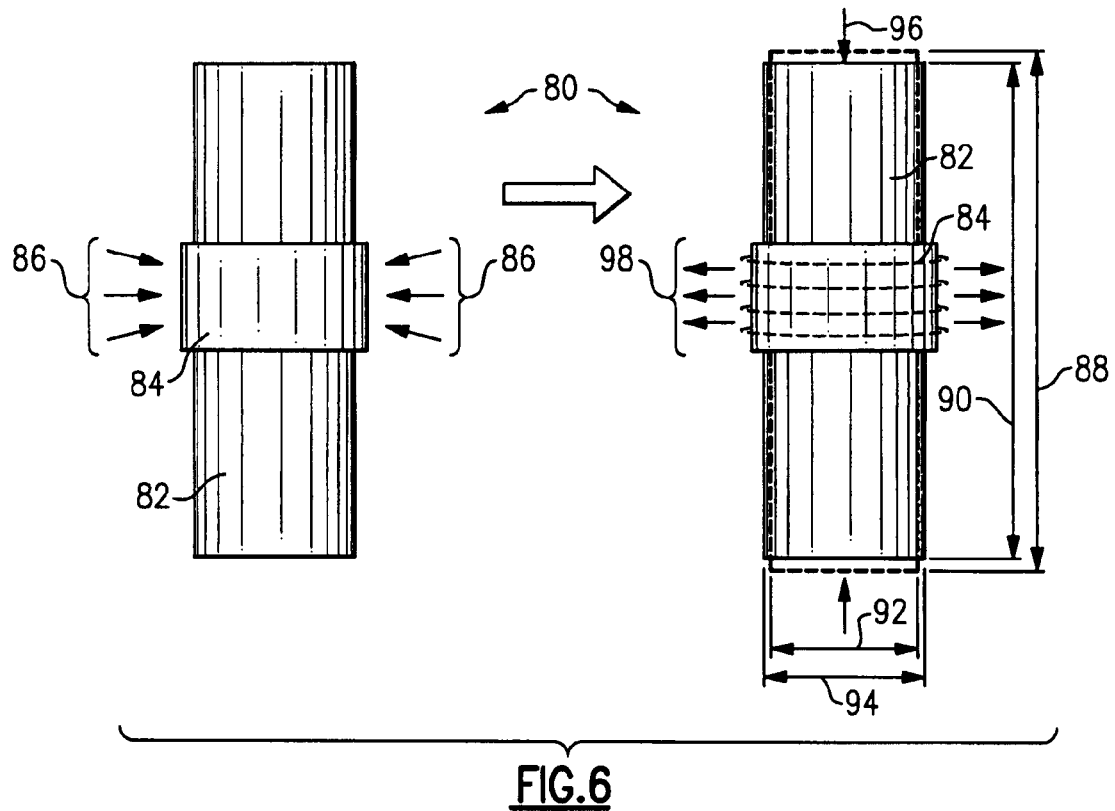
FIG. 6 is a schematic view of another example method of fabricating a torque element according to this invention.

Referring to FIG. 6, another example method of fabricating a magnetoelastic element for a torque sensor is illustrated and includes the initial step of plating a nickel-iron material 86 onto a shaft 82 to form a ring 84. The shaft 82 in this example method is not placed under any load during the nickel-iron-plating process. The nickel-iron-plating process induces certain stresses within the ring 84 and the shaft 82 that may not provide the desired directional anisotropy of ring 84 conducive to the desired orientation of the magnetic field.

Accordingly, deformation of the underlying shaft 82 is utilized to induce stresses on the plated ring 84 and thereby produce the desired circumferential magnetic field orientation. In this process, an axial load 96 is placed on the shaft 82. The axial load is a compressing load resulting in a decrease from a length 88 to a length 90 and an increase in a diameter 92 to a diameter 94. The compressive stresses are applied until plastic deformation occurs such that the desired stresses on the ring material 84 will remain after the load 96 is removed.

The magnetic field generated by the torque element is proportional to the magnetostrictive properties of the ring material. Additionally, the magnetocrystalline properties also affect the amount of hysteresis that will be observed within the sensor under torque. Electroplating a nickel iron material has essentially a nanocrystalline morphology thus is a magnetocrystalline anisotropy that is extremely small. The magnetostriction of the material is determined by the alloy percentages of the ring. The preferred material configuration of the magnetoelastic material includes 45-55% nickel. Such benefits are provided by the plating process utilized by the method of this invention and provide for the fabrication of the favorably reliable and accurate torque sensor.

Figure 7:
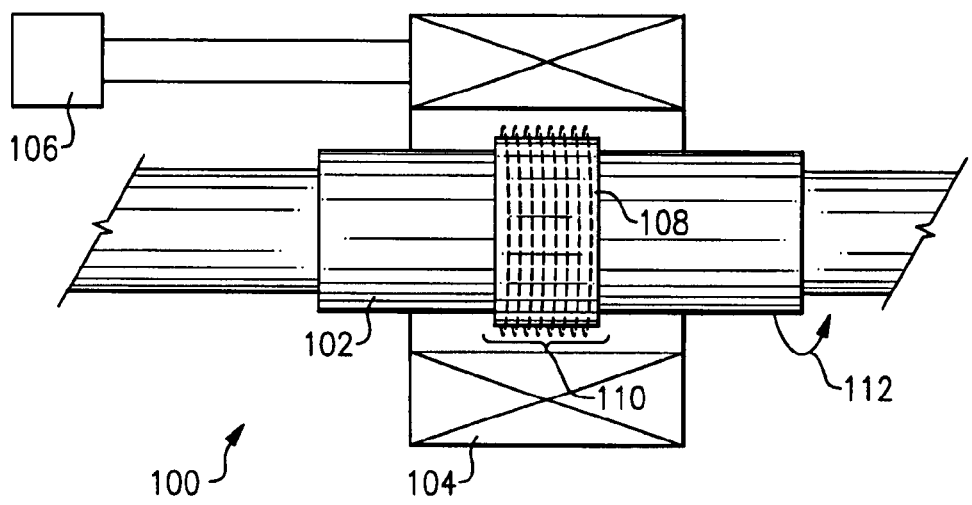
FIG. 7 is a schematic view of an example torque sensor according to this invention.

Referring to FIG. 7, a torque sensor 100 fabricated according to this method includes the magnetoelastic torque element 102 that is plated with a ring material 108. The ring material 108 provides a circumferential easy magnetic access such that a magnetic field 110 is disposed circumferentially about the shaft 102 within the ring 108. A magnetometer 104 is disposed around the shaft 102 and specifically about the ring 108. A torque 112 applied to the shaft 102 will distort the magnetic field 110 which will in turn be detected by the magnetometer 104. The changes in the magnetic field generate a variation in a voltage generated by the magnetometer 104 that is detected by a controller 106 and converted in a known manner to provide measurements of the degree of torque 112 applied to the shaft 102.

The example methods disclosed herein provide advantages known to prior art application by providing great reductions in cost of the application of ring material and increasing performance capability of the torque sensor itself. The plating of transducer material to a shaft increases the maximum torque to which the sensor can be utilized as the adhesion in the plating and the shaft is superior to other methods utilized in prior art methods.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of forming a magnetoelastic element comprising the steps of:
   a) plating a ring of magnetoelastic material onto a portion of a substrate; and
   b) plastically deforming the substrate after plating to endow the magnetoelastic material with a desired stress anisotropy.

2. The method as recited in claim 1, wherein said step b) includes applying an axial load on the substrate.

3. The method as recited in claim 2, wherein said axial load applies a tensile force on said substrate.

4. The method as recited in claim 2, wherein said axial load applies a compressive force on said substrate.

5. The method as recited in claim 3, wherein said axial load causes a permanent elongation of the substrate.

6. The method as recited in claim 1, wherein said substrate comprises a stainless steel material.

7. The method as recited in claim 1, wherein said magnetoelastic material comprises at least a portion of nickel material.

8. The method as recited in claim 1, wherein said substrate comprises a notched diameter within which said magnetoelastic material is plated.

9. The method as recited in claim 1, wherein said desired stress anisotropy comprises circumferentially orientated stresses in said magnetoelastic material to generate a magnetic easy axis circumferentially about said substrate.

10. A method of forming a magnetoelastic torque sensor assembly comprising:
    a) plating a ring of a material comprising nickel about a circumference of a substrate; and
    b) plastically deforming the substrate to generate a desired stress within said ring that provides for the generation of a magnetic filed in a desired orientation.

11. The method as recited in claim 10, wherein said ring of material is comprises nickel and iron.

12. The method as recited in claim 10, wherein said substrate includes a reduced cross-section in an area proximate to the ring of material.

13. The method as recited in claim 10, including the step of plastically deforming the substrate prior to said plating step.

14. The method as recited in claim 13, wherein the step of plastically deforming the substrate comprises exerting an axial tension load on the substrate.

15. The method as recited in claim 13, wherein the step of plastically deforming the substrate comprises exerting an axial compressive load on the substrate.

* * * * *